United States Patent
Bellert

(10) Patent No.: US 10,002,306 B2
(45) Date of Patent: Jun. 19, 2018

(54) MERGING OVERLAPPING BROKEN LINES OF A TABLE

(71) Applicant: Konica Minolta Laboratory U.S.A., Inc., San Mateo, CA (US)

(72) Inventor: Darrell Eugene Bellert, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 90 days.

(21) Appl. No.: 15/198,571

(22) Filed: Jun. 30, 2016

(65) Prior Publication Data

US 2018/0005066 A1    Jan. 4, 2018

(51) Int. Cl.
G06K 9/46 (2006.01)
G06T 7/60 (2017.01)
G06K 9/34 (2006.01)
G06K 9/00 (2006.01)

(52) U.S. Cl.
CPC ......... *G06K 9/342* (2013.01); *G06K 9/00416* (2013.01); *G06K 2209/01* (2013.01)

(58) Field of Classification Search
CPC .. G06K 9/342; G06K 9/4638; G06K 9/00449; G06T 7/11; G06T 9/20; G06T 7/181
See application file for complete search history.

(56) References Cited

U.S. PATENT DOCUMENTS

| 9,047,529 B2* | 6/2015 | Xue | G06K 9/00449 |
| 2005/0063592 A1* | 3/2005 | Li | G06K 9/00476 382/181 |
| 2012/0237094 A1* | 9/2012 | Kurihara | G06K 9/4638 382/128 |

\* cited by examiner

*Primary Examiner* — Brian Werner
(74) *Attorney, Agent, or Firm* — Osha Liang LLP

(57) ABSTRACT

A method for image processing includes obtaining a mask from an image; identifying, in the mask, a first stroke segment and a second stroke segment for possible merging; determining that the first stroke segment comprises a first plurality of cross edges that overlaps a second plurality of cross edges in the second stroke segment; identifying a plurality of cross edge pairs from the first plurality of cross edges and the second plurality of cross edges; determining a count of the plurality of cross edge pairs that satisfy a maximum width tolerance value of the first stroke segment; and merging the first stroke segment and the second stroke segment based on the count.

20 Claims, 15 Drawing Sheets

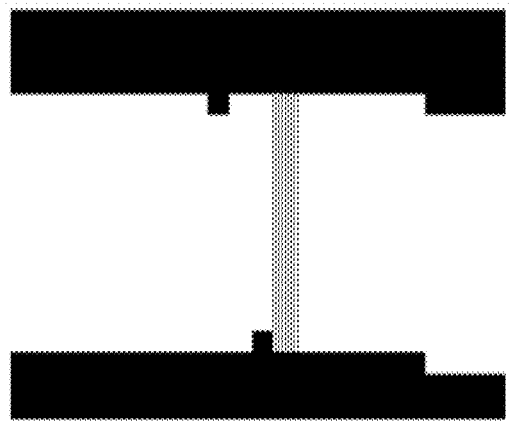
FIG. 9
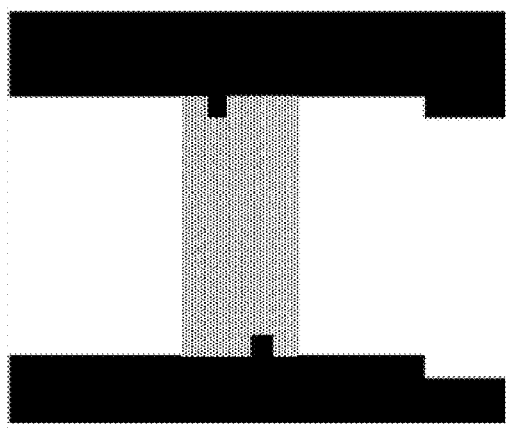
FIG. 10
orientation = HORZ
num_edges = 5
width_min = 11
width_max = 12
width_mode = 12
mode_count = 3
width_mean = 11.6
histogram = (11[2] 12[3])
beg = 9
end = 13
probable_line_width_min = 11
probable_line_width_max = 12
FIG. 11

MERGING OVERLAPPING BROKEN LINES OF A TABLE

BACKGROUND

Writing boards such as whiteboards and blackboards are frequently used in many different settings (e.g., academic, corporate, non-profit, residential, etc.). Various content including text, drawings, tables, charts, and graphs may be drawn or placed on the writing boards for lectures, training, brainstorming sessions, etc.

In order to electronically record these ideas, a photograph of the writing board may be taken. Further, image processing such as optical character recognition (OCR), stroke recognition, and reconstruction may be executed to extract the contents of the writing board from the image.

To recognize the content of a table handwritten on a writing board, the image processor or image processing software must locate the pixels that contribute to the "intent" of the table line along with various attributes of the table geometry, such as stroke width and line color. Once the cells of the table are identified, the content included in the cells (e.g., text) can be sent to a recognition module (e.g., OCR module).

However, as shown in FIG. 27, handwritten table lines may have irregularities that arise from, e.g., a worn pen tip, irregular ink distribution, or low ink. These irregularities often appear as smudged, broken, or faded segments, which can be captured in the mask as shown in FIG. 28. Nonetheless, it is desirable to be able to identify such broken segments as a single stroke with a pen for identifying the table line, which enables the content of the table cell to be recognized precisely.

SUMMARY

In one aspect, the invention relates to a method for image processing. The method comprises obtaining a mask from an image; identifying, in the mask, a first stroke segment and a second stroke segment for possible merging; determining that the first stroke segment comprises a first plurality of cross edges that overlaps a second plurality of cross edges in the second stroke segment; identifying a plurality of cross edge pairs from the first plurality of cross edges and the second plurality of cross edges; determining a count of the plurality of cross edge pairs that satisfies a maximum width tolerance value of the first stroke segment; and merging the first stroke segment and the second stroke segment based on the count.

In another aspect, the invention relates to a non-transitory computer readable medium (CRM) storing computer readable program code embodied therein. The code obtains a mask from an image; identifies, in the mask, a first stroke segment and a second stroke segment for possible merging; determines that the first stroke segment comprises a first plurality of cross edges that overlaps a second plurality of cross edges in the second stroke segment; identifies a plurality of cross edge pairs from the first plurality of cross edges and the second plurality of cross edges; determines a count of the plurality of cross edge pairs that satisfies a maximum width tolerance value of the first stroke segment; and merges the first stroke segment and the second stroke segment based on the count.

In another aspect, the invention relates to an image processing system. The image processing system comprises: a memory; and a processor that obtains a mask from an image; stores the mask in the memory; identifies, in the mask, a first stroke segment and a second stroke segment for possible merging; determines that the first stroke segment comprises a first plurality of cross edges that overlaps a second plurality of cross edges in the second stroke segment; identifies a plurality of cross edge pairs from the first plurality of cross edges and the second plurality of cross edges; determines a count of the plurality of cross edge pairs that satisfies a maximum width tolerance value of the first stroke segment; and merges the first stroke segment and the second stroke segment based on the count.

Other aspects of the invention will be apparent from the following description and the appended claims.

BRIEF DESCRIPTION OF DRAWINGS

FIGS. 9-11 each show an implementation example in accordance with one or more embodiments of the invention.

DETAILED DESCRIPTION

Figure 1:
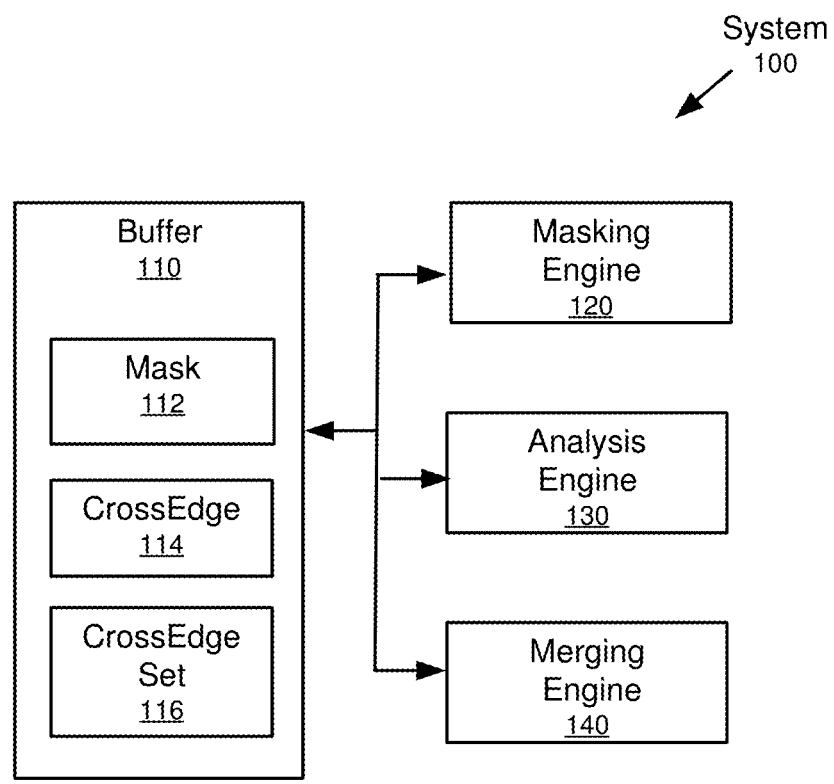
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention generally provide a method, a non-transitory computer readable medium (CRM), and a system for image processing, e.g., merging broken lines of a table.

Figure 27:
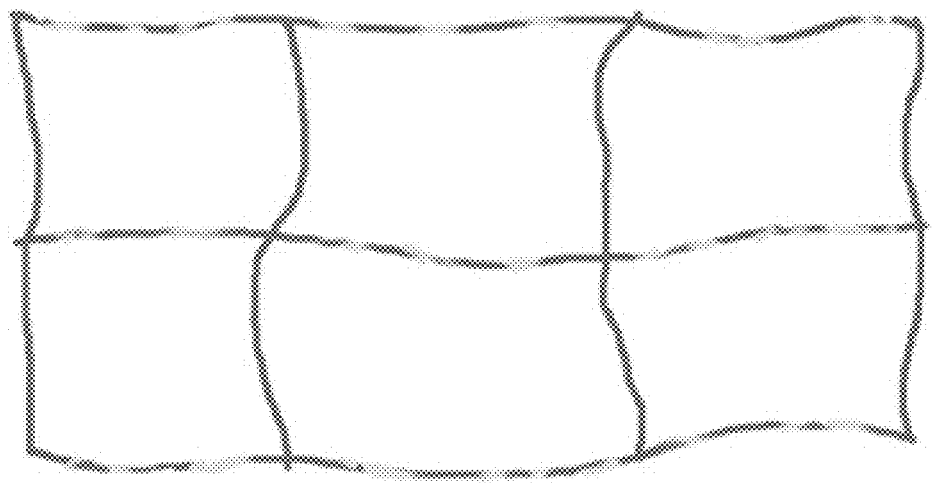
FIG. 27 shows an example of a hand-drawn table on a writing board.
Figure 28:
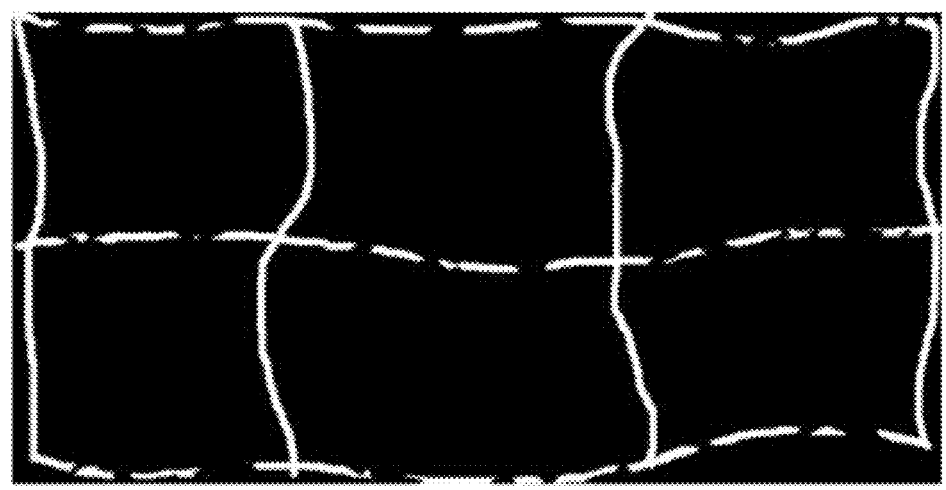
FIG. 28 shows an example of a mask image of a hand-drawn table.

In general, one or more embodiments of the invention can merge different segments of a broken line in a handwritten table, which may contain various irregularities as discussed above with reference to FIGS. 27 and 28, while maintaining the "intent" of the line. This allows subsequent processing systems/engines to be forgiving of errors in the mask of the line caused by the irregularities.

In general, according to one or more embodiments of the invention, when two stroke segments overlap, the two stroke segments are merged based on the number of cross edge pairs that satisfy a maximum width tolerance value (discussed below). In one or more embodiments, if two stroke segments do not overlap, a series of tests are performed to determine how well the two segments can be merged (discussed below). Each test is evaluated and given a score (e.g., from 0 to 1). If a total score (e.g., a simple average of the scores or a weighted average of the scores) calculated from the scores meets a threshold, the segments may be merged.

Initially, according to one or more embodiments of the invention, an image is taken of a stroke drawn on a writing board. Then, a mask of the stroke in the image is obtained. The stroke may be a part of a line or a table. The stroke may be composed of one or more disconnected stroke segments.

Next, a line tracer traces the stroke and determines a plurality of "cross edges" (i.e., pixels of the line perpendicular to the direction of the stroke) for each stroke segment. The line tracer may use a Hough line as a guide for tracing the table line and determine the plurality of cross edges for the stroke segments that intersect with the Hough line. According to one or more embodiments, a class "CrossEdge" is used to record information about the pixels of a cross edge. CrossEdge may also implement methods to return the width and position (e.g., the midpoint) of the edge. For example, the gray vertical strip as shown in FIG. 9 represents a single CrossEdge for one pixel in the mask of the horizontal line.

Further, a set of the cross edges may be generated as a class "CrossEdgeSet." According to one or more embodiments, a CrossEdgeSet is a collection of zero or more CrossEdges along with currently known additional information about all of the cross edges in the set (e.g., the orientation of the line, the number of cross edges, the minimum and maximum widths, a histogram of the widths of all cross edges of the stroke, the mode width, etc.). For example, FIG. 10 shows a CrossEdgeSet including five cross edges, and FIG. 11 shows certain "additional information" about those cross edges. In one or more embodiments of the invention, a CrossEdgeSet is established for each group of adjacent cross edges.

Turning now to FIG. 1, a system (100) in accordance with one or more embodiments of the invention includes a buffer (110), a masking engine (120), an analysis engine (130), and a merging engine (140). Each of these components (110, 120, 130, 140) may be located on the same computing device (e.g., personal computer (PC), laptop, tablet PC, smart phone, server, mainframe, cable box, kiosk, etc.) or may be located on different computing devices connected by a network of any size and any topology having wired and/or wireless segments.

In one or more embodiments of the invention, the system (100) includes the buffer (110). The buffer (110) may be implemented in hardware (i.e., circuitry), software, or any combination thereof. The buffer (110) may be of any size or type (e.g., memory, hard drive, etc.). The buffer (110) may store: a mask (112) of a stroke from an image; CrossEdge (114) for recording the cross edges (pixels of the line perpendicular to the direction of the stroke); and CrossEdgeSet (116) as a collection of the adjacent cross edges (i.e., cross edges corresponding to the same stroke segment).

The image may include a writing board, and a stroke may correspond to a continuous pen marking on the writing board. The mask (112) may be considered a binary image generated by applying a thresholding operation to the image capturing the writing board. As a result of the thresholding operation, irregularities of the stroke may be captured. The stroke may be represented using white pixels in the mask (112), while everything else in the mask (112) may be represented using black pixels. The mask (112) may correspond to all or only a portion of the image. The mask (112) may be generated in the system or obtained (e.g., downloaded) from any source. Further, the mask (112) may be of any size and in any format.

In one or more embodiments of the invention, the system (100) includes the masking engine (120). The masking engine (120) may be implemented in hardware (i.e., circuitry), software, or any combination thereof. The masking engine (120) may read an image capturing the writing board and apply the thresholding operation to the image to obtain the binary image as a mask (112). The masking engine (120) may store the obtained mask (112) in the buffer (110).

In one or more embodiments of the invention, the system (100) includes the analysis engine (130). The analysis engine (130) may be implemented in hardware (i.e., circuitry), software, or any combination thereof. The analysis engine (130) may read the pixels of the mask (112) and identify a plurality of cross edges in the stroke by scanning in the positive and negative direction perpendicular to a direction of the stroke until an off pixel is encountered in the mask (112). In one or more embodiments of the invention, the analysis engine (130) may identify the cross edges that intersect a reference line drawn on the mask (112). As stated above, the reference line may be a Hough line. Additionally, the analysis engine (130) may identify the cross edges that do not intersect the reference line but can be considered parts of the table line.

As discussed above, a class CrossEdge (114) may be used to record information about the pixels of a single cross edge and implement a method in order to return its width. CrossEdge (114) may also implement a method to return its position (e.g., midpoint). FIG. 9 shows a gray vertical strip representing a single cross edge for one pixel in the mask of the horizontal line. In this example, the CrossEdge (114) may record 12 pixels and hence return a width of 12.

After scanning all of the pixels, the analysis engine (130) may generate a CrossEdgeSet (116) based on the CrossEdge (114). As mentioned above, a CrossEdgeSet (116) may include additional information about the cross edges in the set. FIG. 11 shows an example of such additional information for the CrossEdgeSet (116) including five cross edges as shown in FIG. 10. "Orientation" represents an orientation of the stroke (e.g., horizontal or vertical); "num_edges" represents the number of cross edges; "width_min" represents the minimum width of cross edges; "width_max" represents the maximum width of cross edges; "width mode" represents a mode of widths; "mode_count" represents the count of the mode width; "width_mean" represents the mean of the widths; "histogram" represents a data structure including all widths and their frequencies; "beg" and "end" represent the extents of the CrossEdgeSet; and "probable_line_width_min" and "probable_line_width_max" represent the most likely minimum and maximum width of cross edges (hereinafter called "minimum probable width" and "maximum probable width").

In the example of FIG. 10, two cross edges have width "11" and three cross edges have width "12." In that case, the analysis engine (130) may generate a data structure "11[2] 12[3]" shown as "histogram" in FIG. 11. The additional information may be updated each time a cross edge is added or removed from the CrossEdgeSet (116). In one or more embodiments of the invention, the analysis engine (130) establishes two or more CrossEdgeSets (116) each corresponding to a group of adjacent cross edges (i.e., a segment of a stroke).

In one or more embodiments of the invention, the following methods of the class CrossEdgeSet may be used: WidthTolerances( ), ClosestGoodEdge( ), and TrailingMomentum( ).

WidthTolerances( ) sets a minimum and a maximum tolerance value for widths of cross edges that potentially belong to the CrossEdgeSet. The tolerances are computed by first computing the span from the minimum probable width (probable_line_width_min) to the maximum probable width (probable_line_width_max) of the identified cross edges. The maximum tolerance value may be a sum of half of the span and the maximum probable width. The minimum tolerance value may be half of the span subtracted from the minimum probable width.

ClosestGoodEdge( ) takes a specified cross edge as input and finds the cross edge closest to the input cross edge, the width of which is within the tolerance values calculated by WidthTolerances( ) for the CrossEdgeSet. This allows determinations to be made about the line using reliable data.

TrailingMomentum( ) obtains a vector that identifies the momentum of a CrossEdgeSet at an end. The momentum is calculated by finding the vector between the midpoints of a trailing cross edge and the terminal cross edge in the CrossEdgeSet. The trailing cross edge is found by looking for the "closest good edge" by ClosestGoodEdge( ) from a cross edge that is N edges from the terminal cross edge. The terminal cross edge is found by looking for the "closest good edge" by ClosestGoodEdge( ) from the cross edge at the end. N is a parameter and may be set to 20, for example.

In one or more embodiments of the invention, the system (100) includes the merging engine (140). The merging engine (140) may be implemented in hardware (i.e., circuitry), software, or any combination thereof. The merging engine (140) is configured to read two CrossEdgeSets (116) and determine whether the CrossEdgeSets (116) (i.e., different segments of a broken line) can be merged.

Figure 12:
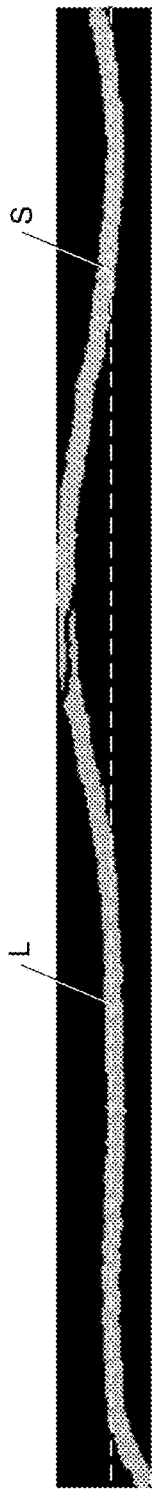
FIGS. 12-25 each show an example of segment merging in accordance with one or more embodiments of the invention.

The merging engine (140) may identify one of the CrossEdgeSets (116) (i.e., the groups of adjacent cross edges) having more cross edges as a first group (hereinafter called "L") and the other as a second group (hereinafter called "S"). In other words, cross edge group L has more cross edges than cross edge group S. FIG. 12 shows an example of the identified groups L and S. In this example, the left group spans from pixel 0 on the left to pixel 464 on the right whereas the right group spans from pixel 422 on the left to pixel 783 on the right. Thus, the merging engine (140) identifies the left group as L.

Next, the merging engine (140) determines whether an overlap exists between the groups L and S. In the following description, a case where the overlap exists is explained first. In this case, the merging engine (140) determines whether to merge L and S based on a maximum tolerance value of a width of the stroke in L and a width of the overlap area.

In one or more embodiments of the invention, the merging engine (140) determines that the overlap area exists by determining the ending point of L (e.g., the right-hand edge of the stroke shown in FIGS. 12 and 13) is greater than or equal to the starting point of S on an axis (e.g., the horizontal axis in FIGS. 12 and 13); and determining the starting point on L is smaller than or equal to the ending point of S on the axis.

Figure 13:

FIG. 13 shows an enlarged view of FIG. 12. In this example, the overlap area exists between L and S because the x-coordinate "464" of the cross edge at the end of L is greater than or equal to the x-coordinate "422" of the cross edge at the beginning of S, and the x-coordinate "0" of the cross edge at the beginning of L is less than or equal to the x-coordinate "783" of the cross edge at the end of S.

In one or more embodiments of the invention, the merging engine (140) identifies a plurality of cross edge pairs from the cross edges in the overlap area, and determines a count of the plurality of cross edge pairs that satisfy a maximum width tolerance value of L. The merging engine (140) merges L and S based on that count. In one or more embodiments of the invention, the merging engine (140) merges L and S when the count is greater than a threshold.

In one or more embodiments of the invention, the threshold equals the cardinality of the plurality of cross edge pairs. In one or more embodiments, the threshold equals a percentage (e.g., 95%, 87%, 70%) of the cardinality of the plurality of cross edge pairs rounded to the nearest whole number.

In one or more embodiments of the invention, the merging engine (140) determines the count by generating a sum for each pair of cross edges. The sum includes the width of a first cross edge in a pair of cross edges, the width of a second cross edge in the pair of cross edges, and a width of an area between the first cross edge and the second cross edge. The sum is compared to the maximum width tolerance value of cross edge group L. The pair of cross edges satisfies the maximum width tolerance value if the sum equals or is less than the maximum width tolerance value.

Figure 14:
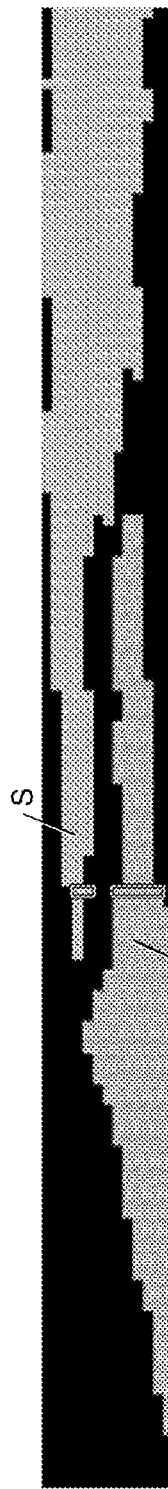
Figure 15:

FIG. 14 and FIG. 15 show an example of the determination about whether L and S can be merged. In this example, L and S each have several cross edges in the overlap area. In FIG. 14, a first cross edge of L having a 5 pixel width and a second cross edge of S having a 2 pixel width and having the same x-coordinate value as the first cross edge are highlighted. There are 2 pixels between the first and the second cross edge. Here, the merging engine (140) calculates the sum as 9 pixels (i.e., 5+2+2). In FIG. 15, the unified edge having a width of 9 pixels is highlighted. Next, the merging engine (140) calculates the maximum tolerance value of L with the above-mentioned function WidthTolerances( ). Provided that the minimum probable width of L is 9 and the maximum probable width of L is 11, the maximum tolerance value is 13. Thus, the merging engine (140) compares the sum (9) with the maximum width tolerance value (13), and determines that this pair of cross edges should be included in the count of cross edges pairs that satisfy the maximum width tolerance value because 9<13. Those of ordinary skill in the art, having the benefit of this detailed description, will appreciate that when a vertical long segment L' and a vertical short segment S' are considered for merging, the focus is on cross edges sharing the same y-coordinate and the horizontal gap between the cross edges sharing the same y-coordinate.

In one or more embodiments, L and S do not overlap. In this case, the merging engine (140) calculates one or more merger eligibility scores (hereinafter "scores") based at least in part on a position, a width, and a direction of the stroke in each of L and S, and determines whether to merge L and S based on an aggregate merger eligibility score (hereinafter "total score") calculated from the scores.

Figure 16:
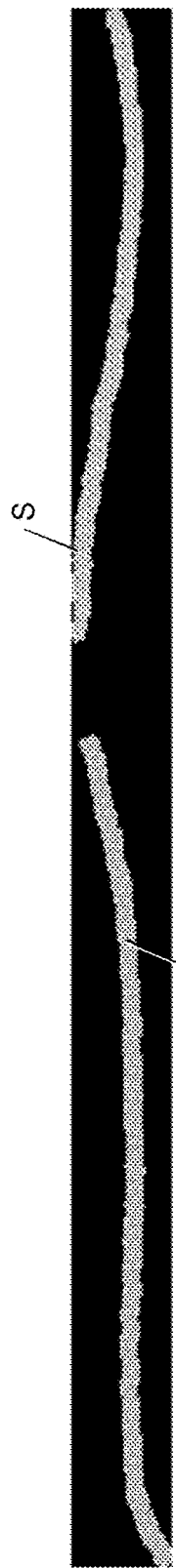

In one or more embodiments of the invention, the merging engine (140) may execute the closeness test. In this test, the merging engine (140) calculates a length of a gap between L and S (e.g., the number of black pixels in the mask between L and S as shown in FIG. 16) and compares the length of the gap with a length of S. The merging engine (140) may set the closeness score to: an upper bound (e.g., 1) when the length of S is greater than the length of the gap; and to a proportion (e.g., ratio) of the length of S to the length of the gap when the length of S is less than or equal to the length of the gap. In other words, the closeness score may be set to the smaller of: the upper bound and the ratio of the length of S to the length of the gap.

In the example shown in FIG. 16, the length of the gap between L and S is computed to be 46 pixels, and the length of S is computed to be 319 pixels. Because the length of S is greater than the length of the gap, the closeness score is set to 1. With this width test, a small gap between L and S or a gap that is roughly the same size as L and S (as in the dashed stroke case) will score high whereas a gap larger than the length of S will score low.

In one or more embodiments of the invention, the merging engine (140) may execute the width test. In this test, the merging engine (140) calculates an amount of a width difference by subtracting the maximum probable width of L from the maximum probable width of S. When the width difference is greater than or equal to 0, the merging engine (140) compares the width difference with the maximum probable width of L and sets the width score to: an upper bound (e.g., 1) when the width difference is less than or equal to the maximum probable width of L; or to a proportion (i.e., ratio) of the maximum probable width of L to the width difference otherwise. In other words, when the width difference equals or exceeds zero, the width score is set to the smaller of: the upper bound (e.g., 1) and the ratio of the maximum probable width of L to the width difference.

On the other hand, when width difference is less than 0, the merging engine (140) compares the absolute value of the width difference with one half of the maximum probable width of L and sets the width score to: an upper bound (e.g., 1) when the absolute value is less than or equal to one half of the maximum probable width of L; or to a proportion (i.e., ratio) of one half of the maximum probable width of L to the absolute value otherwise. In other words, when the width difference is less than zero, the width score is set to the smaller of: the upper bound (e.g., 1) and the ratio of one half the maximum probable width of L to the absolute value of the width difference.

In the example shown in FIG. 16, the maximum probable width of L is 11 pixels, and the maximum probable width of S is also 11 pixels. This indicates that the width growth from L to S is 0. Thus, the width score is set to 1.

In the width test, some width change between L and S (i.e., small growth or shrinkage of the line) is tolerated, but significant changes are not allowed. For example, as discussed above, any change beyond doubling or halving the width of L will count as a penalty.

Figure 17:
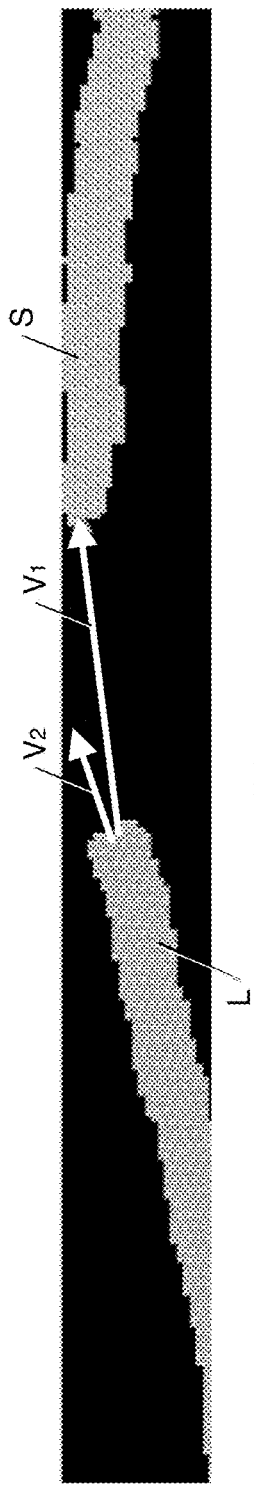

In one or more embodiments of the invention, the merging engine (140) may execute the alignment test. In this test, the merging engine (140) calculates two angles based on two vectors as shown in FIG. 17.

First, the merging engine (140) calculates a first angle (hereinafter "G") based on a vector (hereinafter "$V_1$") that goes from the midpoint of the terminal cross edge of L to the midpoint of the commencing cross edge of S. The terminal cross edge of L is the ClosestGoodEdge( ) of the end cross edge of L. The commencing cross edge of S is the ClosestGoodEdge( ) of the starting cross edge of S.

Second, the merging engine (140) calculates a second angle (hereinafter called "M") based on a vector (hereinafter "$V_2$") from a midpoint of a trailing cross edge in L to the terminal cross edge of L. The trailing cross edge in L is the ClosestGoodEdge( ) of a cross edge located a predetermined distance (i.e., a predetermined number of cross edges (e.g., 20 cross edges)) from the end of L. That is, $V_2$ represents a momentum of L.

Third, the merging engine (140) sets the alignment score to: a lower bound (e.g., 0) when an angular difference between G and M is greater than a predetermined angle (e.g., 45°); and to a proportion (i.e. a ratio) of the angular difference subtracted from the predetermined angle to the predetermined angle otherwise. In other words, the alignment score is set to the greater of: the lower bound (e.g. 0) and a ratio of the angular difference subtracted from the predetermined angle to the predetermined angle.

FIG. 17 shows the vector $V_1$ that goes from the midpoint of the terminal cross edge of L to the midpoint of the commencing cross edge of S. FIG. 17 also shows L's TailingMomentum( ) vector $V_2$. Here, the angle G between $V_1$ and the horizontal axis is −6.7°, and the angle M between $V_2$ and the horizontal axis is −11.4°. Thus, the angular difference between G and M is 4.7°. Hence, when the predetermined angle is 45°, the alignment score is set to (45−4.7)/45=0.9. In the alignment test, if the two vectors point in a similar direction, S is well aligned with the momentum of L and will score high. However, if the two vectors point apart, S is not well aligned with the momentum of L and will score low.

Figure 18:
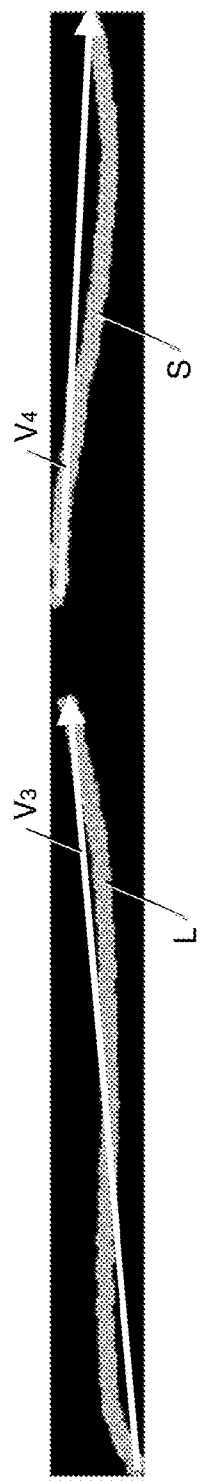
Figure 19:

In one or more embodiments of the invention, the merging engine (140) may execute the angle test. In this test, the merging engine (140) calculates another two angles based on two vectors as shown in FIG. 18.

First, the merging engine (140) calculates a first angle (hereinafter "$A_L$") based on a vector (hereinafter "$V_3$") from the midpoint of the commencing cross edge of L to the midpoint of the terminal cross edge of L. The terminal cross edge of L is the ClosestGoodEdge( ) of the end cross edge of L. The commencing cross edge of L is the ClosestGoodEdge( ) of the starting cross edge of L.

Second, the merging engine (140) calculates a second angle (hereinafter "$A_S$") based on a vector (hereinafter "$V_4$") from the midpoint of the commencing cross edge of S to the midpoint of the terminal cross edge of S. The terminal cross edge of S is the ClosestGoodEdge( ) of the end cross edge of S. The commencing cross edge of S is the ClosestGoodEdge( ) of the starting cross edge of S.

Third, the merging engine (140) sets the angle score to: a lower bound (e.g., 0) when an angular difference between $A_L$ and $A_S$ is greater than a predetermined angle (e.g., 45°); and to a proportion (i.e., a ratio) of the angular difference subtracted from the predetermined angle to the predetermined angle otherwise. In other words, the angle score is set to the greater of: the lower bound (e.g. 0) and a ratio of the angular difference subtracted from the predetermined angle to the predetermined angle.

FIG. 18 shows the vector $V_3$ and the vector $V_4$. Here, the angle $A_L$ between $V_3$ and the horizontal axis is −5.0°, and the angle $A_S$ between $V_4$ and the horizontal axis is 3.2°. Thus, the difference between $A_L$ and $A_S$ is 8.2°. Hence, when the predetermined angle is 45°, the angle score is set to (45−8.2)/45=0.81. In the angle test, the angles that are close together indicate more evidence of a true line and will score high.

In one or more embodiments of the invention, the merging engine (140) may determine that L and S can be merged when a total score calculated from the scores is greater than or equal to a predetermined threshold (e.g., 0.8). In one or more embodiments of the invention, the total score is an average of the scores. In one or more embodiments of the invention, the total score is a sum of the scores each multiplied by a predetermined weight value.

In the aforementioned examples shown in FIGS. 16-18, four scores are calculated, and the average is computed as 0.93. Thus, when the predetermined threshold 0.8 is met, the two groups (segments) L and S are considered as worthy of merging.

In one or more embodiments of the invention, the merging engine (140) may execute modified tests and/or additional tests. For example, the merging engine (140) may calculate the width score based on an increase or a decrease rate of a maximum probable width of L to a maximum probable width of S and set the width score to an upper bound when the increase or the decrease rate is less than or equal to a predetermined rate (e.g., 3 or 1/3). When the predetermined rate is 3, three-time growth is tolerated before penalizing.

In one or more embodiments of the invention, one of the scores is calculated based on an increase or a decrease rate of the maximum probable width of L to the maximum probable width of S, and a highest score is set when the increase or the decrease rate is less than or equal to a predetermined rate.

In one or more embodiments of the invention, the merging engine (140) may calculate the straightness score based on a straightness of the stroke in S and set a higher score when S represents a straighter stroke (i.e., a curvy segment scores lower than a more linear segment).

In one or more embodiments of the invention, the merging engine (140) may calculate a tightness score based on a first range of a minimum and a maximum probable width of L and a second range of a minimum and a maximum probable width of S, and a higher score is set for a greater degree of an overlap of the first and the second range. For example, if L has a width spanning from 14 (minimum probable width) to 16 (maximum probable width) and S has a width spanning from 7 to 32, the width test (discussed above) will score 1, which poorly reflects that S and L have very different widths. A tightness score may be used in addition to or alternatively to the width score to offset a width score that poorly reflects the very different widths of S and L.

In one or more embodiments of the invention, the merging engine (140) may skip one or more of the above-mentioned tests. In other words, one or more of the test may be optional. The merging engine (140) may calculate the total score based on the scores computed in the executed tests.

Although FIG. 1 shows the system (100) as having four components (110, 120, 130, 140), the system (100) may have more or fewer components. For example, the system (100) may include a scanner or a smart phone with a digital camera to capture the image of the writing board from which the mask (112) is generated. As another example, the system (100) may include additional engines to perform additional image processing (e.g., OCR) on the mask (112) to extract the contents (e.g., text characters) in the mask (112).

Figure 2:
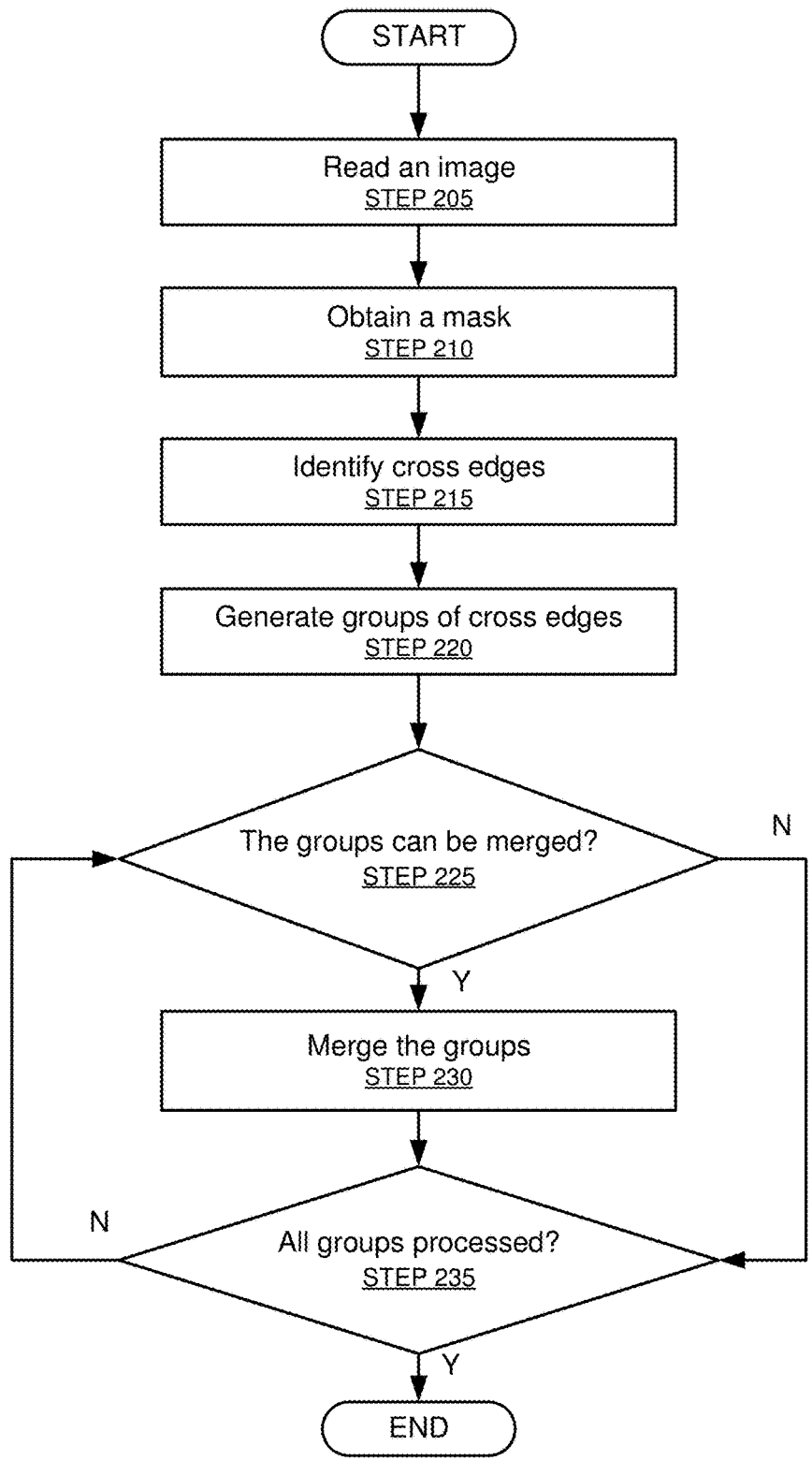
FIGS. 2-8 show flowcharts in accordance with one or more embodiments of the invention.

FIG. 2 shows a flowchart in accordance with one or more embodiments of the invention. The flowchart depicts a process for image processing. One or more of the steps in FIG. 2 may be performed by the components (110, 120, 130, 140) of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, the masking engine (120) reads an image capturing a writing board (STEP 205). The image may include a stroke of a hand-drawn line or table on the writing board. The image may be of any size or format. The image may be obtained from outside of the system (100). Alternatively, the image may be stored on a memory of the system (100) in advance.

In STEP 210, the masking engine (120) obtains or generates a mask (112) from the image. The mask may be of any size or format. The mask may correspond to the entire image or only a portion of the image. The masking engine (120) may store the mask (112) in the buffer (110).

In STEP 215, the analysis engine (130) identifies a plurality of cross edges on the mask by scanning in the positive and the negative direction perpendicular to a direction of the stroke. The analysis engine (130) may identify the cross edges that intersect a Hough line drawn on the mask. Additionally, the analysis engine (130) may identify the cross edges that do not intersect the Hough line but are adjacent to the initially-identified cross edges. As stated above, the cross edges may be broken up into one or more groups of adjacent edges. The analysis engine (130) may use a CrossEdge (114) to record the cross edge pixels including width and positional information. The analysis engine (130) may store CrossEdges (114) in the buffer (110).

In STEP 220, the analysis engine (130) generates groups of the identified cross edges, each represented by CrossEdgeSet (116). CrossEdgeSet (116) stores all of the adjacent cross edges in each group and additional information about the group. The analysis engine (130) may store the CrossEdgeSet (116) in the buffer (110).

In STEP 225, the merging engine (140) determines whether the groups can be merged. The details of the determination process are discussed later.

If it is determined that the groups can be merged, the merging engine (140) merges the groups into a single group (i.e., CrossEdgeSet (116)) in STEP 230. If not, or after executing STEP 230, the merging engine (140) determines whether all groups have been processed in STEP 235. If all groups have been processed, the process completes the operations. If not, the process goes back to STEP 225.

In one or more embodiments of the invention, the merging engine (140) may execute only STEP 225, and return the result (i.e., the determination whether the groups can be merged) to another component that executes STEPs 230 and 235.

Next, referring to FIGS. 3-8, the details of the determination step in FIG. 2 (STEP 225) are discussed. One or more of the steps in FIGS. 3-8 may be performed by the merging engine (140) of the system (100), discussed above in reference to FIG. 1. In one or more embodiments of the invention, one or more of the steps shown in FIGS. 3-8 may be omitted, repeated, and/or performed in a different order than the order shown in FIGS. 3-8. Accordingly, the scope of the invention should not be considered limited to the specific arrangement of steps shown in FIGS. 3-8.

Figure 3:
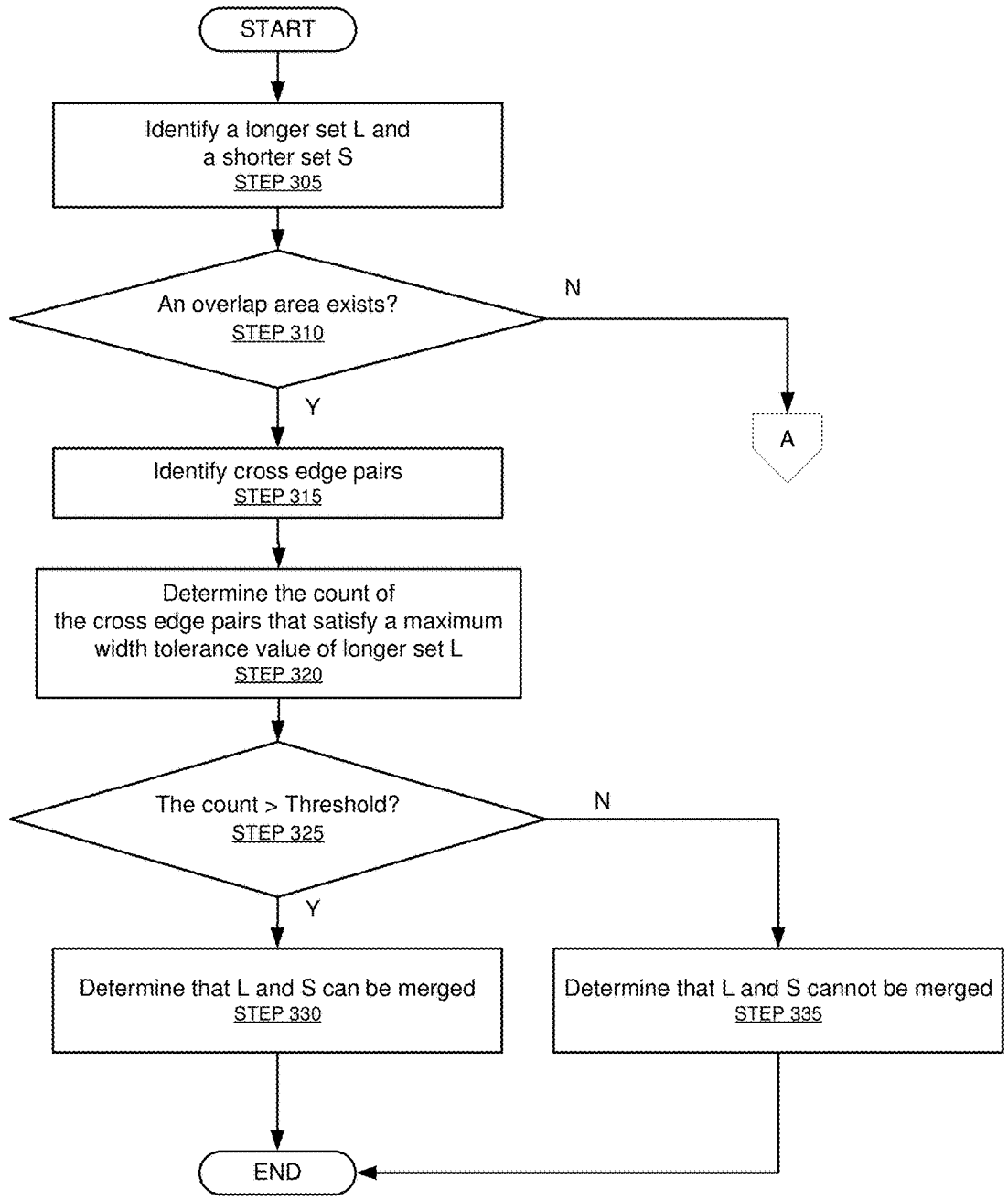

In STEP 305 in FIG. 3, the merging engine (140) determines which cross edge set is longer (i.e., set L) and thus which cross edge set is shorter (i.e., set S). FIG. 12 shows an example of the identified groups L and S using a Hough line as a guide (dashed line).

In STEP 310, the merging engine (140) determines whether an overlap area exists between the groups L and S. As discussed above, the merging engine (140) may determine that the overlap area exists when the x-coordinate value of the cross edge at the end of L is greater than or equal to the x-coordinate value of the cross edge at the beginning of S, and the x-coordinate value of the cross edge at the beginning of L is less than or equal to the x-coordinate value of the cross edge at the end of S. In one or more embodiments of the invention, when merging a vertical long segment L' and a vertical short segment S' drawn in the vertical direction, the merging engine (140) may determine that the overlap area exists when the y-coordinate value of the cross edge at the bottom of L' is greater than or equal to the y-coordinate value of the cross edge at the top of S', and the y-coordinate value of the cross edge at the top of L' is less than or equal to the y-coordinate value of the cross edge at the bottom of S'. When it is determined that the overlap area exists, the process proceeds to STEP 315. Otherwise, the process proceeds to STEP 405 in FIG. 4. The steps of FIG. 4 are discussed later.

In STEP 315, the merging engine (140) identifies a plurality of cross edge pairs from the cross edges of L and S in the overlap area. In other words, the cross edges that overlap are identified. Each pair of cross edges includes a cross edge from L and a cross edge from S.

In STEP 320, the merging engine (140) determines a count of the cross edge pairs that satisfy the maximum width tolerance value of L. In STEP 325, the merging engine (140) determines whether the count is greater than a threshold. If it is determined that the count is greater than the threshold, the merging engine (140) determines that L and S can be merged (STEP 330) and the merging may be executed. Otherwise, the merging engine (140) determines that L and S cannot be merged (STEP 335).

Figure 4:
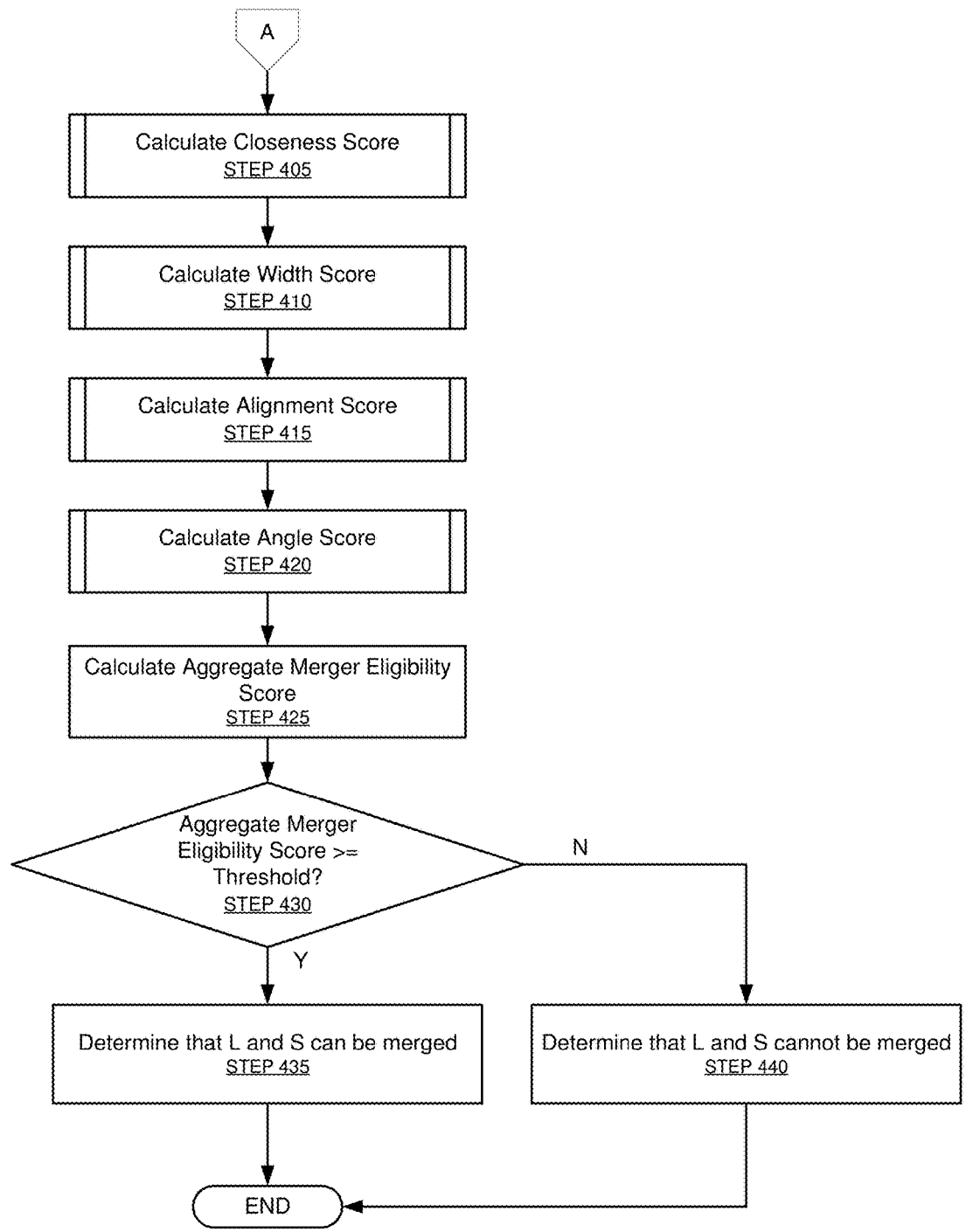

Next, referring to FIG. 4, the steps following STEP 310 in FIG. 3 are described. When it is determined that the overlap area does not exist between L and S, the merging engine (140) executes STEPs 405-440.

In STEP 405, the merging engine (140) calculates the closeness score by executing the closeness test as discussed above. The algorithm of this test is described in FIG. 5.

Figure 5:
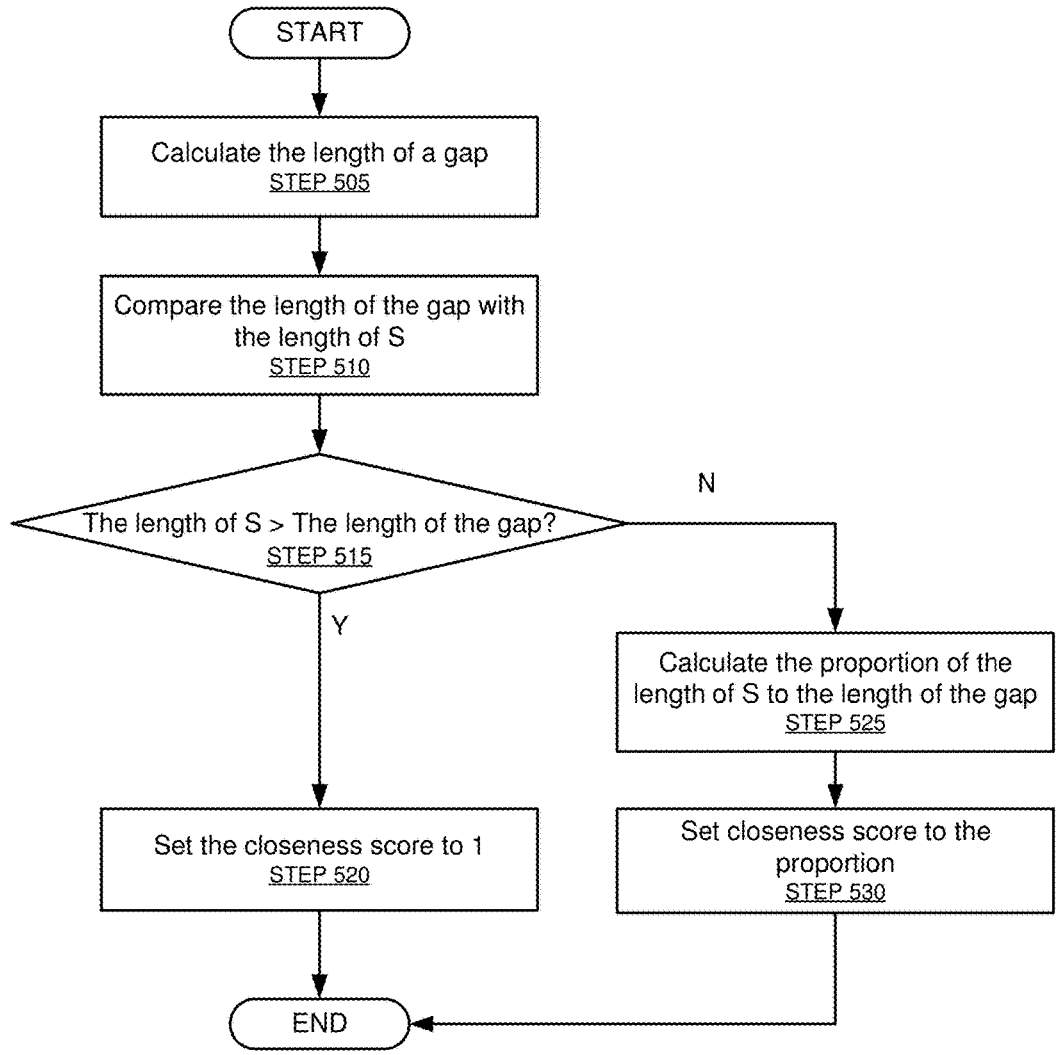

With reference to FIG. 5, in STEP 505, the merging engine (140) calculates a length of a gap between L and S (e.g., the number of black pixels in the mask between L and S as shown in FIG. 16). In STEP 510, the merging engine (140) compares the length of the gap with a length of S. In STEP 515, the merging engine (140) determines whether the length of S is greater than the length of the gap. When the length of S is greater than the length of the gap, in STEP 520, the merging engine (140) sets the closeness score to an upper bound (e.g., 1). When the length of S is less than or equal to the length of the gap, in STEP 525, the merging engine (140) calculates the proportion (i.e., ratio) of the length of S to the length of the gap. In STEP 530, the merging engine (140) sets the closeness score to the calculated proportion (i.e., ratio).

With reference back to FIG. 4, in STEP 410, the merging engine (140) calculates the width score by executing the width test as discussed above. The algorithm of this test is described in FIG. 6.

Figure 6:
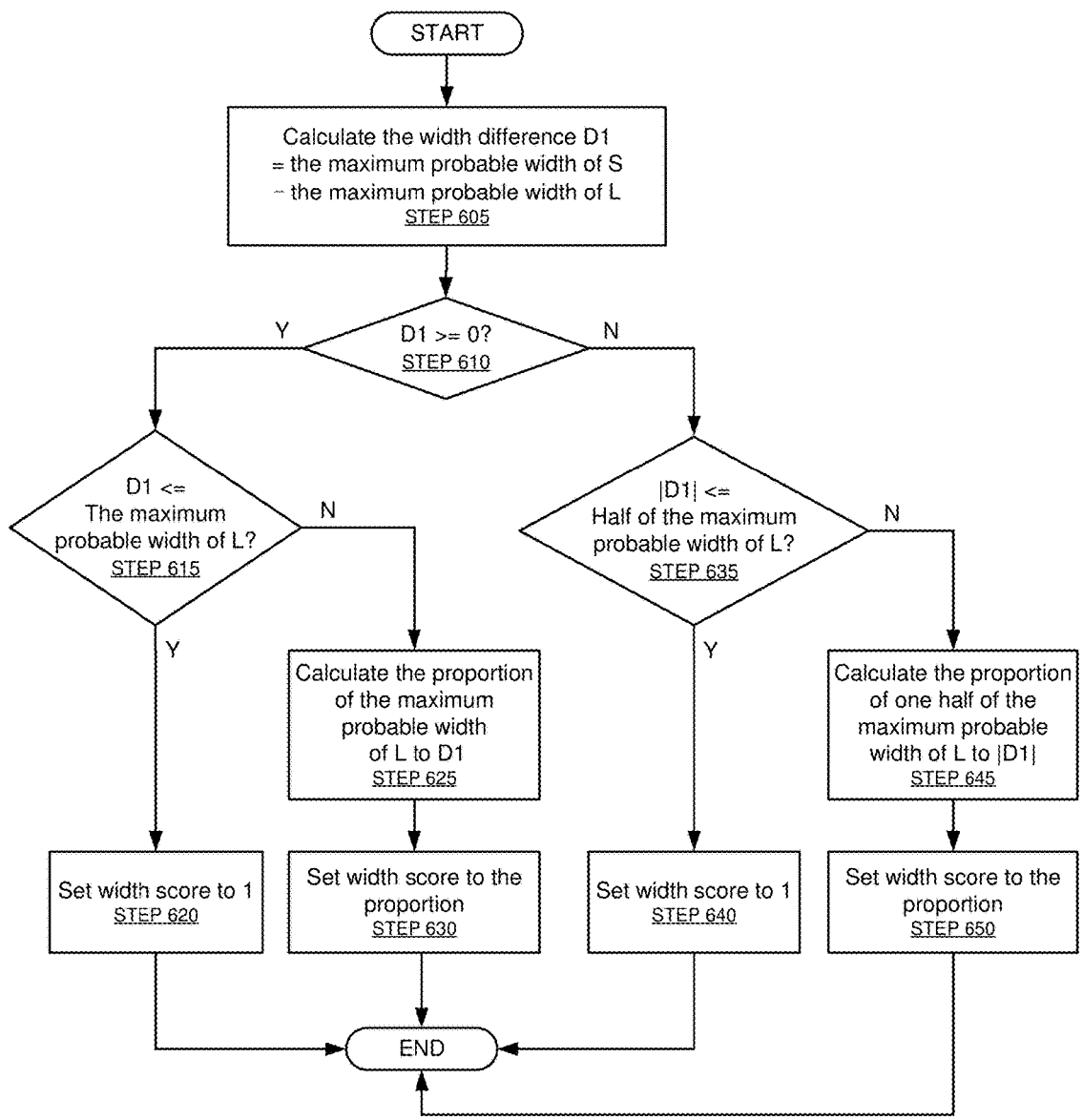

With reference to FIG. 6, in STEP 605, the merging engine (140) calculates the width difference (hereinafter called "D1") by subtracting the maximum probable width of L from the maximum probable width of S. In STEP 610, the merging engine (140) determines whether D1 is greater than or equal to 0.

When it is determined that D1 is greater than or equal to 0, in STEP 615, the merging engine (140) determines whether D1 is less than or equal to the maximum probable width of L. When it is determined that D1 is less than or equal to the maximum probable width of L, in STEP 620, the merging engine (140) sets the width score to an upper bound (e.g., 1). When it is determined that D1 is greater than the maximum probable width of L, in STEP 625, the merging engine (140) calculates the proportion (i.e., ratio) of the maximum probable width of L to D1. In STEP 630, the merging engine (140) sets the width score to the calculated proportion (i.e., ratio).

When it is determined in STEP 610 that D1 is less than 0, in STEP 635, the merging engine (140) determines whether the absolute value of D1 is less than or equal to one half of the maximum probable width of L. When it is determined that the absolute value of D1 is less than or equal to the half of the maximum probable width of L, in STEP 640, the merging engine (140) sets the width score to the upper bound (e.g., 1). When it is determined that the absolute value of D1 is greater than the half of maximum probable width of L, in STEP 645, the merging engine (140) calculates the proportion (i.e. ratio) of one half of the maximum probable width of L to the absolute value of D1. In STEP 650, the merging engine (140) sets the width score to the calculated proportion (i.e., ratio).

With reference back to FIG. 4, in STEP 415, the merging engine (140) calculates the alignment score by executing the alignment test as discussed above. The algorithm of this test is described in FIG. 7.

Figure 7:
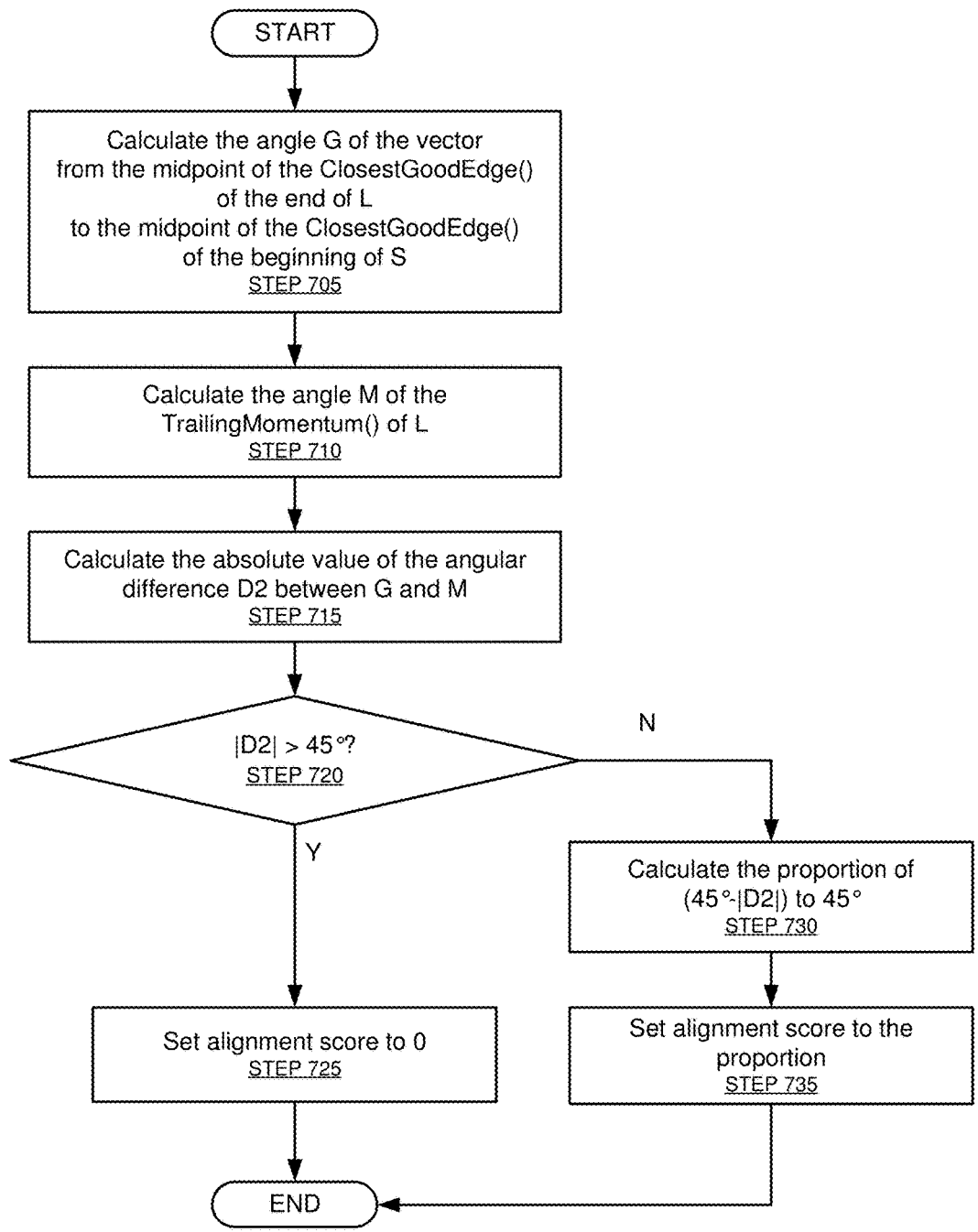

With reference to FIG. 7, in STEP 705, the merging engine (140) calculates the angle G based on the vector $V_1$ from the midpoint of the ClosestGoodEdge( ) of the end of L to the midpoint of the ClosestGoodEdge( ) of the beginning of S. In STEP 710, the merging engine (140) calculates the angle M of the vector $V_2$ of the TrailingMomentum( ) of L. FIG. 17 shows an example of the vectors $V_1$ and $V_2$. In STEP 715, the merging engine (140) calculates the absolute value of the angular difference (hereinafter called "D2") between G and M. In STEP 720, the merging engine (140) determines whether |D2| is greater than a predetermined angle (e.g., 45°). When it is determined that |D2| is greater than the predetermined angle, in STEP 725, the merging engine (140) sets the alignment score to the lower bound (e.g., 0). When it is determined that |D2| is less than or equal to the predetermined angle, in STEP 730, the merging engine (140) calculates the proportion (i.e., ratio) of the |D2| subtracted from the predetermined angle to the predetermined angle. In STEP 735, the merging engine (140) sets the alignment score to the calculated proportion (i.e., ratio).

With reference back to FIG. 4, in STEP 420, the merging engine (140) calculates the angle score by executing the angle test as discussed above. The algorithm of this test is described in FIG. 8.

Figure 8:
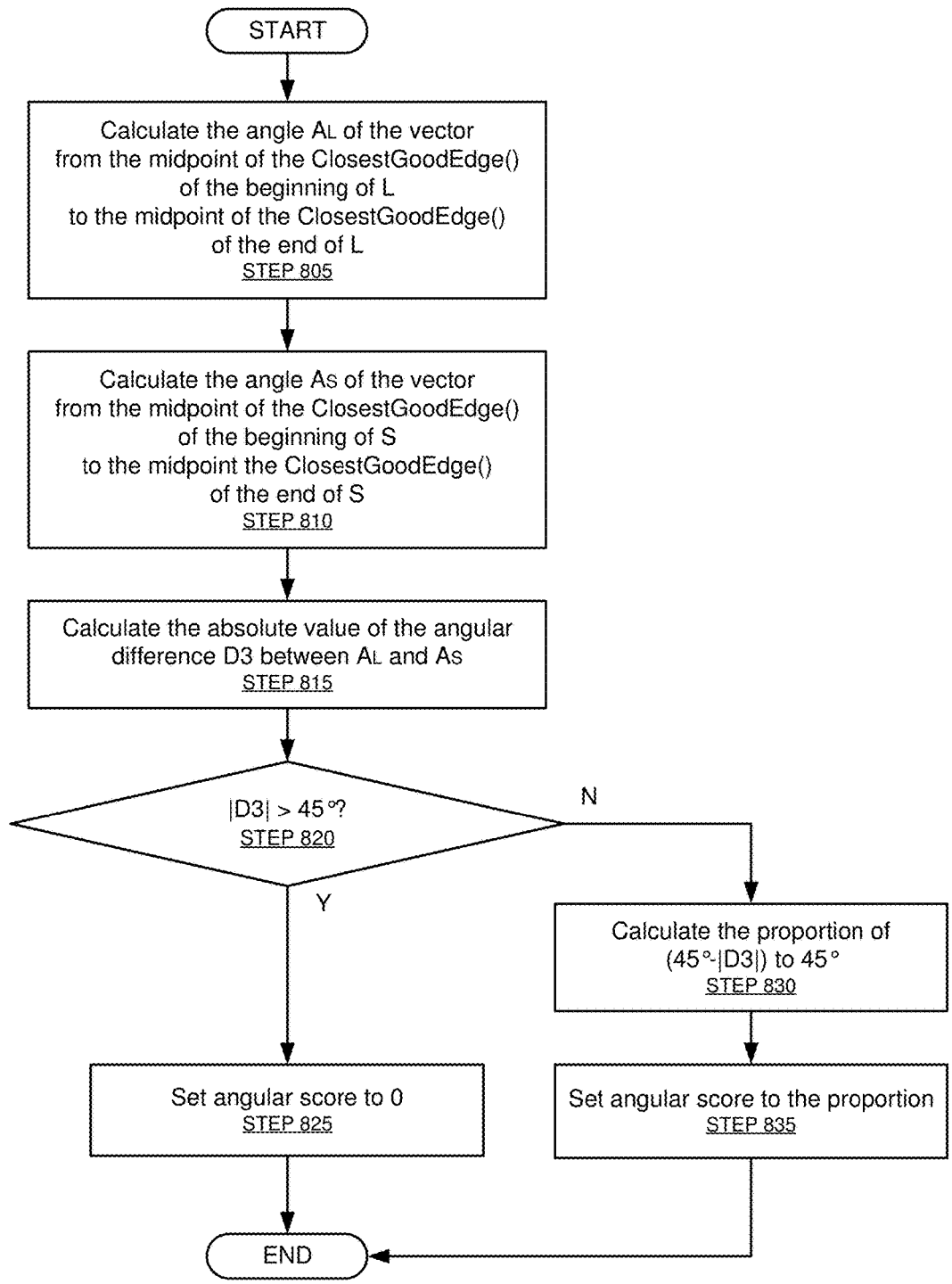

With reference to FIG. 8, in STEP 805, the merging engine (140) calculates the angle $A_L$ based on the vector $V_3$ calculated from the midpoint of the ClosestGoodEdge( ) of the beginning of L and the midpoint of the ClosestGoodEdge( ) of the end of L. In STEP 810, the merging engine (140) calculates the angle $A_S$ based on the vector $V_4$ calculated from the midpoint of the ClosestGoodEdge( ) of the beginning of S and the midpoint of the ClosestGoodEdge( ) of the end of S. FIG. 18 shows an example of the vectors $V_3$ and $V_4$. In STEP 815, the merging engine (140) calculates the absolute value of the angular difference (hereinafter called "D3") between $A_L$ and $A_S$. In STEP 820, the merging engine (140) determines whether |D3| is greater than the predetermined angle (e.g., 45°). When it is determined that |D3| is greater than the predetermined angle, in STEP 825, the merging engine (140) sets the angle score to the lower bound (e.g., 0). When it is determined that |D3| is less than or equal to the predetermined angle, in STEP 830, the merging engine (140) calculates the proportion (i.e., ratio) of the |D3| subtracted from the predetermined angle to the predetermined angle. In STEP 835, the merging engine (140) sets the angle score to the calculated proportion (i.e., ratio).

With reference back to FIG. 4, in STEP 425, the merging engine (140) calculates the total score. As discussed above, the total score may be an average of the scores or a sum of the scores each multiplied by a predetermined weight value.

In STEP 430, the merging engine (140) determines whether the total score is greater than or equal to a threshold value. When it is determined that the total score is greater than or equal to the threshold value, the merging engine (140) determines that L and S can be merged in STEP 435 and the merging may be executed. Otherwise, the merging engine (140) determines that L and S cannot be merged in STEP 440.

With reference to FIGS. 19-25, two examples of the determination whether to merge two segments in a hand-drawn line are described below.

Figure 20:

The first example is shown in FIGS. 19-22. In this example, a writer has accidentally erased a portion of the horizontal table line and the letter 'C' with her finger. Using a Hough line (dashed line in FIG. 20) as a guide, the two groups L and S are identified as candidates for merging, as shown in FIG. 20. Here, L does not overlap with S. Hence, according to STEPs 405-440 in FIG. 4, a series of tests are executed to calculate a total score.

First, the closeness score is calculated according to the procedure of FIG. 5. The length of S is computed to be 163 pixels, and the length of the gap between L and S is computed to be 73 pixels. Since the length of S is greater than the length of the gap, the closeness score is set to 1.

Second, the width score is calculated according to the procedure of FIG. 6. L has the maximum probable width of 11, and S has the maximum probable width of 15. The width difference D1 between L and S is 4. Since D1 (4) is less than the maximum probable width of L (11), the width score is set to 1.

Figure 21:
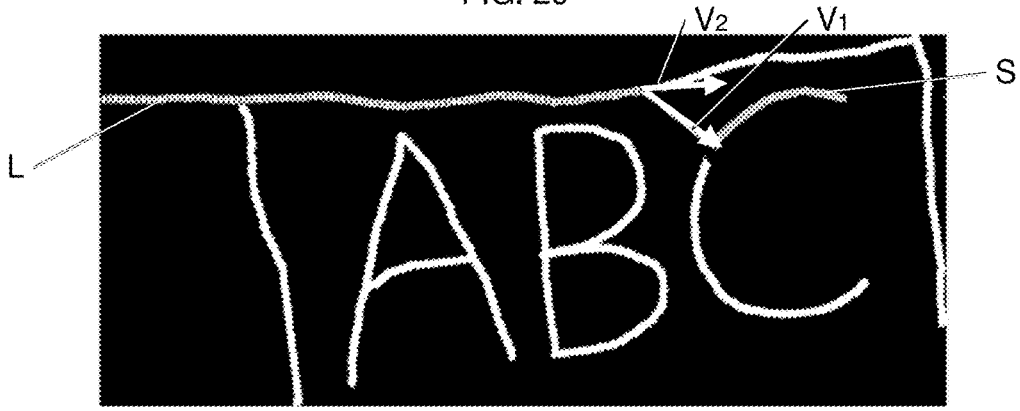

Third, the alignment score is calculated according to the procedure of FIG. 7. FIG. 21 shows the vector $V_1$ that goes from the midpoint of the ClosestGoodEdge( ) of the end of L to the midpoint of the ClosestGoodEdge( ) of the beginning of S, and L's TrailingMomentum( ) vector $V_2$. The angles G and M of the vectors $V_1$ and $V_2$ are 38.9° and −6.5°, respectively. Thus, the angular difference D2 between the two vectors is 45.4°. Since D2 is greater than 45°, the alignment score is set to 0.

Figure 22:
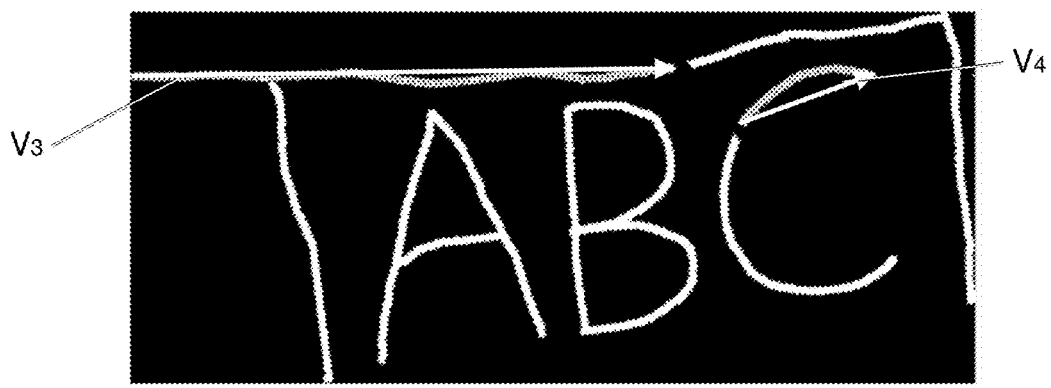

Fourth, the angle score is calculated according to the procedure of FIG. 8. FIG. 22 shows the vector $V_3$ that goes from the midpoint of the ClosestGoodEdge( ) of the beginning of L to the midpoint of the ClosestGoodEdge( ) of the end of L, and the vector $V_4$ that goes from the midpoint of the ClosestGoodEdge( ) of the beginning of S to the midpoint of the ClosestGoodEdge( ) of the end of S. The angles $A_L$ and $A_S$ of these two vectors $V_3$ and $V_4$ are −0.8° and −18.8°, respectively. Thus, the angular difference D3 between the two vectors is 18°. Hence, the angle score is set to (45−18)/45=0.6.

Finally, the average of these 4 scores is computed as 0.65. Thus, when the predetermined threshold is 0.8, these segments will be declared as not worthy of merging. Those of ordinary skill in the art, having the benefit of this detailed description, will appreciate that this is the correct outcome as S and L should not be merged.

Figure 23:
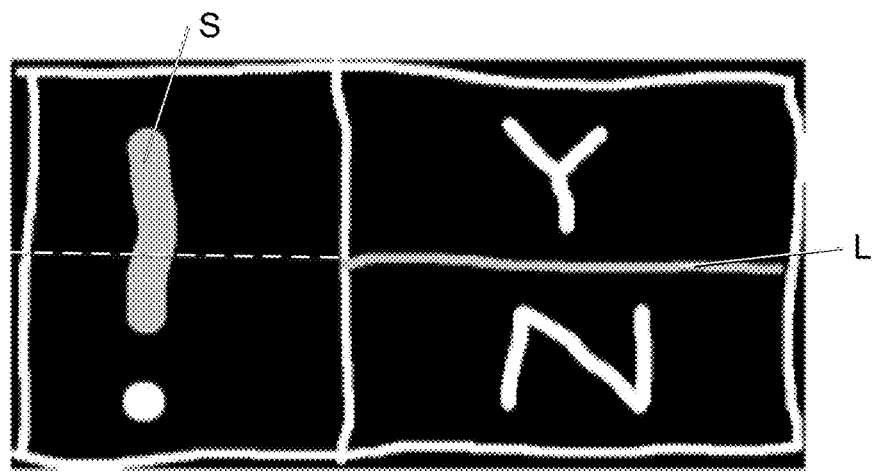
Figure 24:
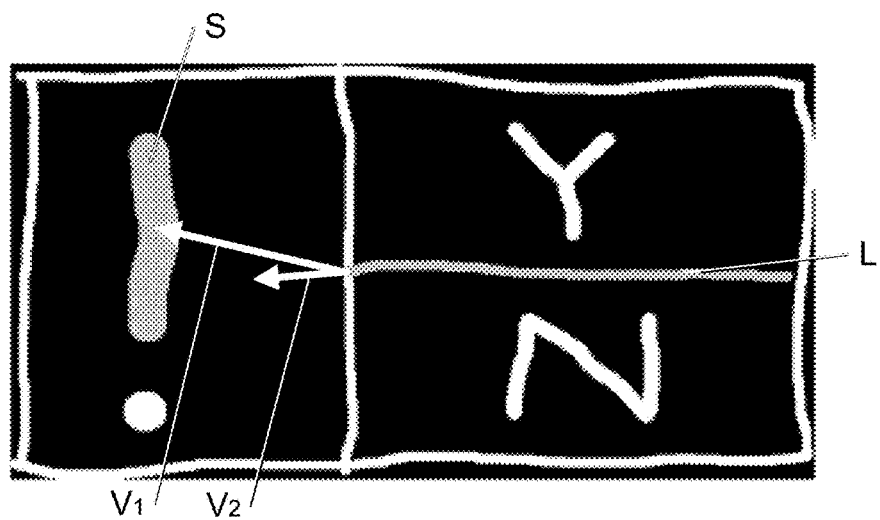
Figure 25:
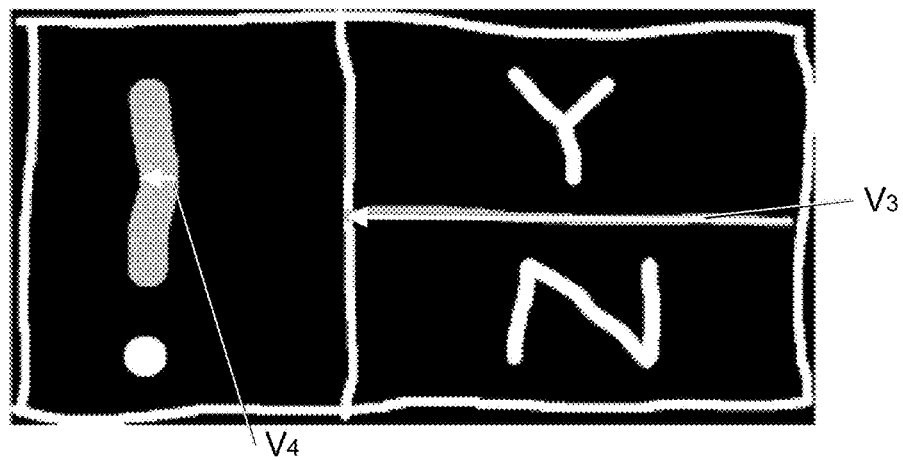

The second example is shown in FIGS. 23-25. This example focuses on the middle horizontal line of the split cell. Using a Hough line (dashed line in FIG. 23) as a guide, the middle table line (identified as L) and a portion of the exclamation mark (identified as S) become candidates for merging. Here, L does not overlap with S. Thus, a series of tests are executed to calculate a total score.

First the closeness score is calculated. The length of S is computed to be 38 pixels, and the length of the gap between L and S is computed to be 161 pixels. The closeness score is set to the proportion of the length of S to the length of the gap, which is 38/161=0.24.

Second, the width score is calculated. L has the maximum probable width "10," and S has the maximum probable width "197." The amount of the width difference D1 between L and S is 187. Since D1 "187" is greater than the maximum probable with of L "10," the width score is set to the proportion of the maximum probable width of L to the growth, which is 10/187=0.05.

Third, the alignment score is calculated. FIG. 24 shows the vector $V_1$ that goes from the midpoint of the ClosestGoodEdge( ) of the end of L to the midpoint of the ClosestGoodEdge( ) of the beginning of S, and L's TrailingMomentum( ) vector $V_2$. The angles G and M of the vectors $V_1$ and $V_2$ are 192° and 174°, respectively. Thus, the angular difference D2 between the two vectors is 18°, and the alignment score is set to (45−18)/45=0.6.

Fourth, the angle score is calculated. FIG. 25 shows the vector $V_3$ that goes from the midpoint of the ClosestGoodEdge( ) of the beginning of L to the midpoint of the ClosestGoodEdge( ) of the end of L, and the vector $V_4$ that goes from the midpoint of the ClosestGoodEdge( ) of the beginning of S to the midpoint of the ClosestGoodEdge( ) of the end of S. The angles $A_L$ and $A_S$ of these two vectors $V_3$ and $V_4$ are 181° and 180°, respectively. Thus, the angular difference D3 between the two vectors is 1°. Hence, the angle score is set to (45−1)/45=0.97.

As a result, the average of these 4 scores is computed as 0.46. Thus, when the predetermined threshold is 0.8, these segments will be declared as not worthy of merging. Those of ordinary skill in the art, having the benefit of this detailed description, will appreciate that this is the correct outcome as S and L should not be merged.

Figure 26:
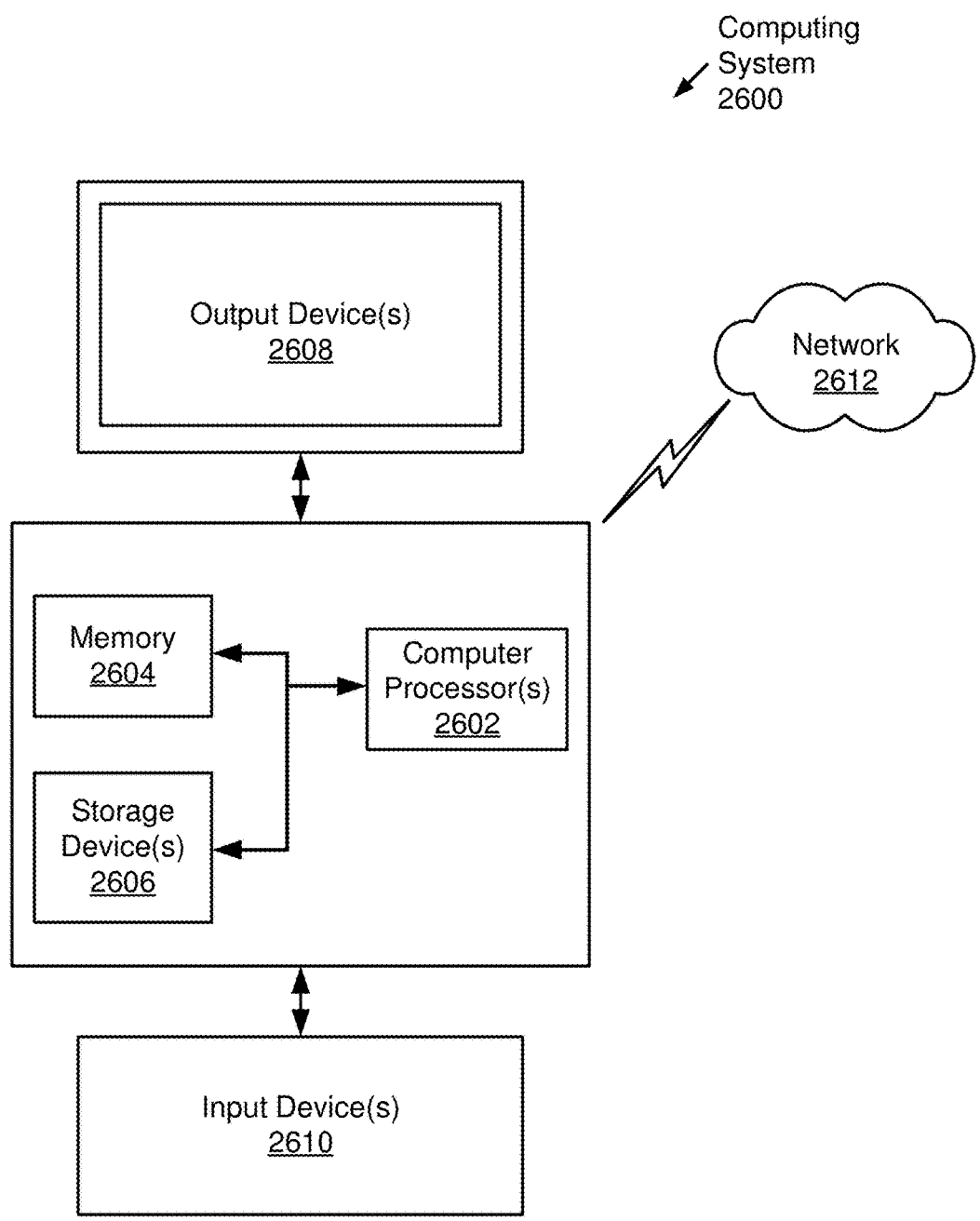
FIG. 26 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 26, the computing system (2600) may include one or more computer processor(s) (2602), associated memory (2604) (e.g., random access memory (RAM), cache memory, flash memory, etc.), one or more storage device(s) (2606) (e.g., a hard disk, an optical drive such as a compact disk (CD) drive or digital versatile disk (DVD) drive, a flash memory stick, etc.), and numerous other elements and functionalities. The computer processor(s) (2602) may be an integrated circuit for processing instructions. For example, the computer processor(s) (2602) may be one or more cores or micro-cores of a processor. The computing system (2600) may also include one or more input device(s) (2610), such as a touchscreen, keyboard, mouse, microphone, touchpad, electronic pen, or any other type of input device. Further, the computing system (2600) may include one or more output device(s) (2608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (2600) may be connected to a network (2612) (e.g., a local area network (LAN), a wide area network (WAN) such as the Internet, mobile network, or any other type of network) via a network interface connection (not shown). The input and output device(s) may be locally or remotely (e.g., via the network (2612)) connected to the computer processor(s) (2602), memory (2604), and storage device(s) (2606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (2600) may be located at a remote location and connected to the other elements over a network (2612). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for image processing, comprising:
   obtaining a mask from an image;
   identifying, in the mask, a first stroke segment and a second stroke segment for possible merging;
   determining that the first stroke segment comprises a first plurality of cross edges that overlaps a second plurality of cross edges in the second stroke segment in a width-wise direction of the first and second stroke segments;
   identifying a plurality of cross edge pairs from the first plurality of cross edges and the second plurality of cross edges;
   determining a count of the plurality of cross edge pairs that satisfies a maximum width tolerance value of the first stroke segment; and
   merging the first stroke segment and the second stroke segment based on the count.

2. The method of claim 1, wherein determining that the first stroke segment comprises the first plurality of cross edges that overlaps the second plurality of cross edges comprises:
   determining an ending point of the first stroke segment is greater than or equal to a starting point of the second stroke segment on an axis; and
   determining a starting point on the first stroke segment is smaller than or equal to an ending point of the second stroke segment on the axis.

3. The method of claim 1, wherein determining the count comprises:
   generating a sum by summing a width of a first cross edge in a pair of cross edges, a width of a second cross edge in the pair of cross edges, and a width of an area between the first cross edge and the second cross edge,
   wherein the first plurality of cross edges comprises the first cross edge, and
   wherein the second plurality of cross edges comprises the second cross edge; and
   comparing the sum to the maximum width tolerance value of the first stroke segment,
   wherein the pair of cross edges satisfies the maximum width tolerance value in response to the sum equaling or being less than the maximum width tolerance value.

4. The method of claim 1, wherein merging the first stroke segment and the second stroke segment based on the count comprises:
   comparing the count to a threshold, wherein the first stroke segment and the second stroke segment are merged in response to the count equaling or exceeding the threshold.

5. The method of claim 4, wherein the threshold equals the cardinality of the plurality of cross edge pairs.

6. The method of claim 1, further comprising:
   determining the length of the first stroke segment exceeds the length of the second segment; and
   calculating the maximum width tolerance value of the first stroke segment based on a minimum probable width and a maximum probable width of the first stroke segment.

7. The method of claim 6, wherein the maximum width tolerance value is the maximum probable width of the first stroke segment plus one-half the span between the minimum probable width and the maximum probable width.

8. The method of claim 1, wherein identifying the first stroke segment and the second stroke segment comprises:
   determining a stroke in the mask by applying the Hough transform to the mask,
   wherein the Hough line intersects the first stroke segment and the second stroke segment.

9. A non-transitory computer readable medium (CRM) storing computer readable program code embodied therein that:
   obtains a mask from an image;
   identifies, in the mask, a first stroke segment and a second stroke segment for possible merging;
   determines that the first stroke segment comprises a first plurality of cross edges that overlaps a second plurality of cross edges in the second stroke segment in a width-wise direction of the first and second stroke segments;
   identifies a plurality of cross edge pairs from the first plurality of cross edges and the second plurality of cross edges;
   determines a count of the plurality of cross edge pairs that satisfies a maximum width tolerance value of the first stroke segment; and
   merges the first stroke segment and the second stroke segment based on the count.

10. The non-transitory CRM of claim 9, wherein determining that the first stroke segment comprises the first plurality of cross edges that overlaps the second plurality of cross edges comprises:
    determining an ending point of the first stroke segment is greater than or equal to a starting point of the second stroke segment on an axis; and
    determining a starting point on the first stroke segment is smaller than or equal to an ending point of the second stroke segment on the axis.

11. The non-transitory CRM of claim 9, wherein determining the count comprises:
    generating a sum by summing a width of a first cross edge in a pair of cross edges, a width of a second cross edge in the pair of cross edges, and a width of an area between the first cross edge and the second cross edge, wherein the first plurality of cross edges comprises the first cross edge, and wherein the second plurality of cross edges comprises the second cross edge; and comparing the sum to the maximum width tolerance value of the first stroke segment, wherein the pair of cross edges satisfies the maximum width tolerance value in response to the sum equaling or being less than the maximum width tolerance value.

12. The non-transitory CRM of claim 9, wherein merging the first stroke segment and the second stroke segment based on the count comprises:

comparing the count to a threshold, wherein the first stroke segment and the second stroke segment are merged in response to the count equaling or exceeding the threshold.

13. The non-transitory CRM of claim 12, wherein the threshold equals the cardinality of the plurality of cross edge pairs.

14. The non-transitory CRM of claim 9, further storing computer readable program code embodied therein that:

determines the length of the first stroke segment exceeds the length of the second segment; and calculates the maximum width tolerance value of the first stroke segment based on a minimum probable width and a maximum probable width of the first stroke segment.

15. The non-transitory CRM of claim 14, wherein the maximum width tolerance value is the maximum probable width of the first stroke segment plus one-half the span between the minimum probable width and the maximum probable width.

16. The non-transitory CRM of claim 9, wherein identifying the first stroke segment and the second stroke segment comprises:

determining a stroke by applying the Hough transform to the mask, wherein the Hough line intersects the first stroke segment and the second stroke segment.

17. An image processing system comprising:

a memory; and a processor that:

obtains a mask from an image;

stores the mask in the memory;

identifies, in the mask, a first stroke segment and a second stroke segment for possible merging;

determines that the first stroke segment comprises a first plurality of cross edges that overlaps a second plurality of cross edges in the second stroke segment in a width-wise direction of the first and second stroke segments;

identifies a plurality of cross edge pairs from the first plurality of cross edges and the second plurality of cross edges;

determines a count of the plurality of cross edge pairs that satisfies a maximum width tolerance value of the first stroke segment; and merges the first stroke segment and the second stroke segment based on the count.

18. The image processing system of claim 17, wherein determining that the first stroke segment comprises the first plurality of cross edges that overlaps the second plurality of cross edges comprises:

determining an ending point of the first stroke segment is greater than or equal to a starting point of the second segment on an axis; and determining a starting point on the first stroke segment is smaller than or equal to an ending point of the second stroke segment on the axis.

19. The image processing system of claim 17, wherein determining the count comprises:

generating a sum by summing a width of a first cross edge in a pair of cross edges, a width of a second cross edge in the pair of cross edges, and a width of an area between the first cross edge and the second cross edge, wherein the first plurality of cross edges comprises the first cross edge, and wherein the second plurality of cross edges comprises the second cross edge; and comparing the sum to the maximum width tolerance value of the first stroke segment, wherein the pair of cross edges satisfies the maximum width tolerance value in response to the sum equaling or being less than the maximum width tolerance value.

20. The image processing system of claim 17, wherein merging the first stroke segment and the second stroke segment based on the count comprises:

comparing the count to a threshold, wherein the first stroke segment and the second stroke segment are merged in response to the count equaling or exceeding the threshold.

\* \* \* \* \*